(12) United States Patent
Venneri

(10) Patent No.: US 11,101,048 B2
(45) Date of Patent: Aug. 24, 2021

(54) FULLY CERAMIC MICROENCAPSULATED FUEL FABRICATED WITH BURNABLE POISON AS SINTERING AID

(71) Applicant: Ultra Safe Nuclear Corporation, Seattle, WA (US)

(72) Inventor: Francesco Venneri, Los Alamos, NM (US)

(73) Assignee: ULTRA SAFE NUCLEAR CORPORATION, Seattle, WA (US)

(*) Notice: Subject to any disclaimer, the term of this patent is extended or adjusted under 35 U.S.C. 154(b) by 491 days.

(21) Appl. No.: 15/363,060

(22) Filed: Nov. 29, 2016

(65) Prior Publication Data

US 2017/0287575 A1 Oct. 5, 2017

Related U.S. Application Data

(60) Provisional application No. 62/314,746, filed on Mar. 29, 2016.

(51) Int. Cl.
| | | |
|---|---|---|
| *G21C 3/62* | (2006.01) | |
| *G21C 3/04* | (2006.01) | |
| *G21C 3/28* | (2006.01) | |
| *G21C 21/02* | (2006.01) | |

(52) U.S. Cl.
CPC ............ *G21C 3/623* (2013.01); *G21C 3/044* (2013.01); *G21C 3/28* (2013.01); *G21C 3/62* (2013.01); *G21C 3/626* (2013.01); *G21C 21/02* (2013.01); *G21C 3/045* (2019.01); *Y02E 30/30* (2013.01)

(58) Field of Classification Search
CPC . G21C 3/58; G21C 3/62; G21C 3/623; G21C 3/626
See application file for complete search history.

(56) References Cited

U.S. PATENT DOCUMENTS

| | | |
|---|---|---|
| 2,950,238 A | 8/1960 | Nicholson |
| 3,826,754 A | 7/1974 | Grossman |
| 3,907,948 A | 9/1975 | Gyarmati et al. |
| 4,297,169 A | 10/1981 | Grubb |
| 4,597,936 A | 7/1986 | Kaae |
| 4,683,114 A | 7/1987 | Ho et al. |

(Continued)

FOREIGN PATENT DOCUMENTS

| | | |
|---|---|---|
| CN | 101 188 147 B | 7/2011 |
| CN | 105 139 898 A | 12/2015 |
| CN | 105 185 418 A | 12/2015 |
| JP | 2006-504086 A | 2/2006 |
| JP | 2006-234405 A | 9/2006 |
| JP | 2007-010472 A | 1/2007 |

(Continued)

OTHER PUBLICATIONS

Chen, Z. "Effects of Gadolinia and Alumina Addition on the Densification and Toughening of Silicon Carbide" J. Am. Ceram. Soc. 1996, 79(2), pp. 530-532. (Year: 1996).*

(Continued)

*Primary Examiner* — Sharon M Davis
(74) *Attorney, Agent, or Firm* — RatnerPrestia

(57) ABSTRACT

A methodology is disclosed for compaction of a ceramic matrix of certain nuclear fuels incorporating neutron poisons, whereby those poisons aid in reactor control while aiding in fuel fabrication. Neutronic poisons are rare-earth oxides that readily form eutectics suppressing fuel fabrication temperature, of particular importance to the fully ceramic microencapsulated fuel form and fuel forms with volatile species.

18 Claims, 5 Drawing Sheets

(56) References Cited

U.S. PATENT DOCUMENTS

| | | | |
|---|---|---|---|
| 4,707,330 A | 11/1987 | Ferrari | |
| 4,869,867 A | 9/1989 | Lay et al. | |
| 4,869,886 A | 9/1989 | Saiki et al. | |
| 4,963,758 A | 10/1990 | Noren et al. | |
| 4,978,480 A | 12/1990 | Stansfield et al. | |
| 5,268,947 A | 12/1993 | Bastide et al. | |
| 5,805,657 A | 9/1998 | Heubeck | |
| 6,162,543 A | 12/2000 | Dubots et al. | |
| 8,475,747 B1 | 7/2013 | Johnson et al. | |
| 9,224,506 B2 | 12/2015 | Broil et al. | |
| 9,299,464 B2 * | 3/2016 | Venneri | G21C 3/20 |
| 9,620,248 B2 | 4/2017 | Venneri | |
| 10,032,528 B2 | 7/2018 | Venneri | |
| 10,109,378 B2 | 10/2018 | Snead | |
| 10,475,543 B2 | 11/2019 | Venneri | |
| 10,573,416 B2 | 2/2020 | Venneri | |
| 2003/0113447 A1 | 6/2003 | Sherwood et al. | |
| 2005/0195933 A1 | 9/2005 | Dorr et al. | |
| 2006/0039524 A1 | 2/2006 | Feinroth et al. | |
| 2008/0159464 A1 | 7/2008 | Futterer et al. | |
| 2008/0240334 A1 * | 10/2008 | Senor | G21C 3/626 |
| | | | 376/416 |
| 2009/0032178 A1 | 2/2009 | Feinroth | |
| 2010/0290578 A1 | 11/2010 | Farrell et al. | |
| 2010/0296621 A1 | 11/2010 | Broli et al. | |
| 2011/0080987 A1 | 4/2011 | Watanabe et al. | |
| 2011/0091004 A1 | 4/2011 | Farmer et al. | |
| 2011/0169178 A1 | 7/2011 | Picart et al. | |
| 2011/0317794 A1 | 12/2011 | Venneri et al. | |
| 2012/0140867 A1 * | 6/2012 | Venneri | G21C 3/20 |
| | | | 376/414 |
| 2012/0207264 A1 * | 8/2012 | Van Den Berghe | G21C 3/626 |
| | | | 376/414 |
| 2013/0077731 A1 | 3/2013 | Sherwood et al. | |
| 2013/0114781 A1 * | 5/2013 | Venneri | G21C 3/07 |
| | | | 376/419 |
| 2014/0220230 A1 | 8/2014 | Kuczynski | |
| 2015/0170767 A1 | 6/2015 | Venneri | |
| 2015/0221398 A1 | 8/2015 | Subhash et al. | |
| 2015/0310948 A1 | 10/2015 | Venneri et al. | |
| 2017/0025192 A1 | 1/2017 | Snead | |
| 2017/0287577 A1 | 10/2017 | Venneri | |
| 2017/0301415 A1 | 10/2017 | Venneri | |
| 2017/0301423 A1 | 10/2017 | Pierce | |
| 2018/0040385 A1 * | 2/2018 | Hong | G21C 3/328 |

FOREIGN PATENT DOCUMENTS

| | | |
|---|---|---|
| JP | 2007-086024 A | 4/2007 |
| JP | 2010-512529 A | 4/2010 |
| KR | 10-2013-0102766 A | 9/2013 |
| KZ | 30987 A4 | 3/2016 |
| RU | 2317601 C1 | 2/2008 |
| RU | 76744 U1 | 9/2008 |
| RU | 2516282 C2 | 5/2014 |
| RU | 2013130000 A | 1/2015 |
| SU | 1656974 A1 | 10/1993 |
| WO | WO-2008/071676 A1 | 6/2008 |
| WO | WO-2009/058185 A2 | 5/2009 |
| WO | WO-2009/079068 A2 | 6/2009 |
| WO | WO-2010/086431 A1 | 8/2010 |
| WO | WO-2012/047657 A2 | 4/2012 |
| WO | WO-2012/047657 A3 | 7/2012 |
| WO | WO 2012/129677 A1 | 10/2012 |
| WO | WO-2014/028731 A1 | 2/2014 |
| WO | WO-2017/019620 A1 | 2/2017 |

OTHER PUBLICATIONS

Raju, K. Yoon, D-H. "Sintering Additives for SiC based on the reactivity: A review" Ceramics International 2016, http://dx.doi.org/10.1016/j.ceramint.2016.09.022 (Year: 2016).*

Talamo, A. "Conceptual Design of Quadriso Particles with Europium Burnable Absorber in HTRS" Argonne National Laboratory, Argonne (2010); available at https://publications.anl.gov/anlpubs/2010/05/66879.pdf (Year: 2010).*

Yano, T. et al., "Effects of SiO2 and Rare-Earth Oxide Additions on Densification and Mechanical Properties of Silicon Carbide Ceramics" Key Engineering Materials 247 (2003) 165-168. (Year: 2003).*

And/or Talamo, A. "Effects of the burnable poison heterogeneity on the long term control of excess of reactivity" Annals of Nuclear Energy 33 (2006) 794-803. (Year: 2006).*

International Search Report and Written Opinion dated Mar. 13, 2017 in corresponding International patent application No. PCT/US2016/063975 (13 pages).

Extended European search report dated Sep. 19, 2019 issued in European patent application No. 16897455.8.

International Search Report and Written Opinion dated Dec. 8, 2016 issued in corresponding International Patent Application No. PCT/US2016/043897 (10 pages).

International search report and the written opinion dated Aug. 8, 2017 issued in corresponding international patent application No. PCT/US2017/019887 (13 pages).

International Search Report and Written Opinion dated Jul. 11, 2017 issued in corresponding International patent application No. PCT/US2017/024794 (15 pages).

International Preliminary Report on Patentability dated Jun. 4, 2013, in International Patent Application No. PCT/US2011/062560, filed Nov. 30, 2011.

K. D. Weaver et al., Gen IV Nuclear Energy Systems: Gas-Cooled Fast Reactor (GFR), FY-04 Annual Report, Sep. 2004, Idaho National Engineering and Environmental Laboratory, INEEL/EXT-04-02361.

M. K. Meyer et al., Fuel Development for Gas-Cooled Fast Reactors, Journal of Nuclear Materials, 371 (2007), pp. 281-287.

Sterbentz, J.W. et al., "Reactor Physics Parametric and Depletion Studies in Support of TRISO Particle Fuel Specification for the Next Generation Nuclear Plant," INEEL/EXT-04-02331, Sep. 2004, Idaho National Engineering and Environmental Laboratory, Idaho Falls, Idaho.

TRISCO-Coated Particle Fuel Phenomenon Indentification and Ranking Tables (PIRTs) for Fission Product Transport Due to Manufacturing, Operations, and Accidents, NUREG-6844, vol. 1, Jul. 2004, U.S. Nuclear Regulatory Commission, Washington, DC.

TRISCO-Coated Particle Fuel Phenomenon Identification and Ranking Tables (PIRTs) for Fission Product Transport Due to Manufacturing, Operations, and Accidents, Appendices A through D, Nureg-6844, vol. 2, Jul. 2004, U.S. Nuclear Regulatory Commission, Washington, DC.

TRISCO-Coated Particle Fuel Phenomenon Identification and Ranking Tables (PIRTs) for Fission Product Transport Due to Manufacturing, Operations, and accidents, Appendices E through I, NUREG-6844, vol. 3, Jul. 2004, U.S. Nuclear Regulatory Commission, Washington, DC.

U.S. Office Action dated Jan. 8, 2014 that issued in U.S. Appl. No. 12/959,115 including Double Patenting Rejections on pp. 3-5.

IAEA Safeguards Glossary, 2001 Edition, International Nuclear Verification Series No. 3. (Year: 2002).

Partial supplementary European search report dated Oct. 9, 2019 issued in European patent application No. 17776183.0.

Extended European search report dated Oct. 21, 2019 issued in European patent application No. 17776569.0.

Extended European search report dated Jan. 23, 2020 issued in European patent application No. 17776183.0.

First Russian Office Action issued in Russian patent application No. 2018137808, dated Apr. 27, 2020 (7 pages) and its English-language translation thereof (8 pages).

Decision to Grant issued in Russian patent application No. 2018106636 dated Mar. 26, 2020 (8 pages) and its English-language translation thereof (5 pages).

* cited by examiner

FULLY CERAMIC MICROENCAPSULATED FUEL FABRICATED WITH BURNABLE POISON AS SINTERING AID

CROSS-REFERENCE TO RELATED APPLICATION

This application claims benefit to U.S. provisional application No. 62/314,746 filed on Mar. 29, 2016, the entire contents of which is incorporated by reference herein.

TECHNICAL FIELD

The present disclosure relates to an improved method of forming improved nuclear fuel. More specifically, the present disclosure relates to a method of fabricating a known accident tolerant fuel known as the fully ceramic fully ceramic microencapsulated fuel with improved function.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

There are many known types of nuclear fuel for both research and power producing nuclear reactors. The most common example is the ceramic uranium oxide pellet that is contained within a thin metallic cladding. That cladding both provides a rigid structure to hold the fuel and serves as the barrier to fission product release to the coolant stream. A second example is an inert matrix fuel (IMF) in which a fissile material such as (or containing) U-235 is dispersed in an inert host matrix. That inert matrix may be SiC. In this case the host matrix may contain the fission product that is produced. Yet a third example is a microencapsulated fuel (such as the TRISO fuel) whereby the SiC layer of the small diameter microencapsulated fuel provides a first barrier to fission product release and a large number of these fuel beads are typically compacted in a porous graphite matrix. A fourth example is the fully ceramic microencapsulated (FCM) fuel that is embodied by a plurality of TRISO particles compacted within a fully dense silicon carbide matrix. That fuel has been developed and previously described as a more robust fuel whereby the SiC layer of the microencapsulated "TRISO" fuel and the dense ceramic SiC matrix into which they are contained provide two barriers to fission product release in addition to any external cladding that may be present.

In comparison with the common example of uranium oxide pellets, the FCM fuel has a relatively small fraction of volume occupied by fissile fuel. Specifically, fissile uranium of the conventional uranium dioxide pellet is uniformly distributed at some enrichment level throughout the ceramic (e.g. at 5% enrichment, 5% of the uranium atom lattice sites of $UO_2$ are occupied by fissile U-235.) In contrast, the volume available for fissile fuel in the FCM is limited to the kernel of the TRISO. As the volume fraction of TRISO microencapsulation making up the fuel compact is typically less than 45% and the TRISO itself is comprised of the fuel kernel surrounded by non-fuel layers of graphite and SiC, the actual space available for fuel within the FCM is typically less than 20% of the total volume. Of that nominal 20%, the relative amount of fissile fuel depends on the enrichment of the TRISO fuel "kernel" in a similar fashion to the standard $UO_2$ fuel. For this reason, higher fissile fuel density, achieved by higher fissile enrichment or alternative fissile fuel forms may be necessary for the FCM fuel to achieve nominally the same amount of fissile content per volume of fuel.

The increased relative enrichment of U-235 in uranium bearing fuels has a number of practical consequences: reduced relative amount of U-238, reduced parasitic neutron absorption and plutonium breeding due to the reduced U-238, and high initial core reactivity decreasing rapidly with fuel burnup. Such a large reactivity swing is typically undesirable and in most systems mitigating steps are taken to flatten the reactivity profile as a function of fuel burnup. This is often addressed through the use of neutron poisons. A neutron poison, also known as a neutron absorber or nuclear poison, is a substance with an extraordinarily large neutron capture cross-section. While such materials may be deemed undesirable in nuclear reactors, they are commonly used to control core reactivity as a function of time during the nuclear fuel cycle, especially early in the fuel cycle when the fresh fuel has a high reactivity. Operationally, these poisons can take a number of forms: burnable poisons, non-burnable poisons, and soluble poisons:

Burnable Poisons: In order to control excess reactivity of fresh fuel it is desirable to have a high cross-section material that captures a neutron and transmutes to a lower cross-section material, thus slowly becoming a less effective poison. Ideally this loss of effectiveness (or decreasing negative reactivity) would be matched to the reactor fuel's decrease in positive reactivity as the reactor core produces power. Ideally burnable poison isotopes deplete to near non existence towards the end of the core lifetime. Fixed burnable poisons such as boron or gadolinium are used in fuel itself within today's power reactors for this purpose.

Non-Burnable Poisons: In contrast to a burnable poison, a non-burnable poison has (practically) an ignorable change in negative reactivity with time. It does not slowly burn away. Materials such as hafnium having multiple isotopes, each of which have large neutron capture cross sections, is an example of a non-burnable poison. They may be used on control rods or blades that are inserted or removed from the core to control the reactivity of the core.

Soluble Poisons: By dissolving the poison into liquid coolant or fuel (e.g. aqueous solution in water) it can be near uniformly distributed through the core and provide certain neutronic benefits. This is accomplished through inclusion of boric acid in the water coolant of pressurized water reactors (PWR's.) By either increasing or decreasing the boric acid content within the PWR core reactivity can be controlled, though the control-feedback is a rather slow process. While this system is not widespread and has an undesirable effect on the moderator temperature reactivity coefficient it is common use for PWR's in the United States. The boron concentration in the water coolant of these reactors typically starts at values close to 2000 ppm at the beginning of the cycle and decreases to nil at the end of the cycle.

SUMMARY

It is recognized that when fuel that includes TRISO fully microencapsulated within a fully dense ceramic is used within the core of a power reactor there can be a need to manage the high initial reactivity caused by the relatively high initial fissile isotope inventory in comparison to typical $UO_2$ fuel. It has been discovered that a process as described below can achieve production of a fuel that includes TRISO fully microencapsulated within a fully dense ceramic and burnable poisons within the body of the fuel. In doing so the large positive reactivity intrinsic to the fuel that includes TRISO fully microencapsulated within a fully dense ceramic is mitigated as a design element of the fuel itself, thus obviating the need for external reactor control systems.

One method that achieves production of a fuel that includes fuel particles fully microencapsulated within a fully dense ceramic including a neutronic poison comprises: providing a plurality of fuel particles; mixing the fuel particles with ceramic powder and rare earth oxide neutronic poisons to form a precursor mixture; and compacting the precursor mixture at a predetermined pressure and temperature to form a fuel element.

In an embodiment according to the method described above, the fuel particles are tristructural-isotropic fuel particles (TRISO).

The rare-earth oxide neutronic poisons can include rare-earth oxides having desirable neutronic and processing (eutectic) properties. Specifically, the eutectic properties can include the ability to suppress the sintering temperature of the ceramic powder below the critical damage temperature of the TRISO. The neutronic properties can include a large neutron capture cross-section to absorb neutrons so as to flatten the reactivity profile as a function of fuel burnup. In some previous methods of forming a fuel that includes TRISO fully microencapsulated within a fully dense ceramic, sintering aids such as alumina and/or yttria were used. Replacing some or all of the alumina and/or yttria sintering aid with rare-earth oxide neutronic poisons conveys minimal or no added cost to the fabrication process while significantly reducing or eliminating the need and related cost of the reactor systems for monitoring and control of the poison level within the coolant.

In certain embodiments, the rare-earth oxide neutronic poisons are selected from the group consisting of $Gd_2O_3$, $Er_2O_3$, $Dy_2O_3$, and $Eu_2O_3$, and combinations thereof.

In certain embodiments, the method further comprises mixing additional sintering additives to the precursor mixture of ceramic powder and rare earth oxide neutronic poisons. For example, the additional sintering additives may include alumina, yttria, or other rare earth oxides, or combinations thereof. In other embodiments, the only oxide sintering additives in the precursor mixture is one or more rare earth oxide neutronic poisons. In more certain embodiments, the precursor mixture consists essentially of ceramic powder and rare earth oxide neutronic poisons.

In an embodiment according to any of the above methods, the ceramic powder comprises silicon carbide (SiC).

In an embodiment according to any of the above methods, the precursor mixture includes the rare earth oxide neutronic poisons in an amount up to 10 weight percent of the total weight of the precursor mixture. In certain embodiments the amount of rare earth oxide neutronic poisons is in an amount of 0.5 to 10 weight percent, or, in more certain embodiments, 1 to 10 weight percent, or, in even more certain embodiments, 2 to 10 weight percent, or, in yet even more certain embodiments, 6 to 10 weight percent of the total weight of the precursor mixture. In more particular embodiments according to any of the above methods, the combination of the rare earth oxide neutronic poisons and any additional sintering additives is in an amount up to 10 weight percent of the total weight of the precursor mixture, or, in more particular embodiments, 6 to 10 weight percent of the total weight of the precursor mixture. In certain embodiments in which additional sintering additives are present, the rare earth oxide neutronic poisons are included in an amount of 0.5 to 6 weight percent, or, in more certain embodiments, 1 to 5 weight percent, or, in even more certain embodiments, 1 to 3 weight percent, or, in yet even more certain embodiments, 1 to 2 weight percent of the total weight of the precursor mixture.

In an embodiment according to any of the above methods, the predetermined temperature is less than 1900° C., or, in certain embodiments, less than 1850° C., or, in more certain embodiments, about 1800° C.

In an embodiment according to any of the above methods, the predetermined pressure is less than 30 MPa, or, in certain embodiments, less than 20 MPa, or, in more certain embodiments, about 10 MPa.

In a similar embodiment, the powder mixture including the rare earth poison may undergo an alternative rapid sintering process consistent with mass production such as direct current or spark plasma sintering.

In a similar embodiment as described above the powder mixture including the rare earth poison may be sintered or rendered to near full density within a ceramic or graphite tube thereby maintaining a fixed outer dimension throughout the forming process.

In an embodiment according to any of the above methods, the fuel element comprises near stoichiometric SiC. In certain embodiments, matrix surrounding the TRISO in the fuel element has a low porosity, for example, less than 4%, less than 3%, or less than 1%. In such embodiments, the matrix forms a gas-impermeable barrier that acts as a secondary barrier to fission products/actinides diffusion and other radioactivity releases from the fuel particles. In certain embodiments, the matrix has low permeability to helium, for example less than $10^{-10}$ $m^2/S$ or less than $10^{-11}$ $m^2/s$.

In an embodiment according to any of the above methods, the ceramic powder comprises SiC having an average size of less than 1 μm, or, in certain embodiments, 15 nm to 60 nm, or, in more certain embodiments, 20 nm to 50 nm, or, in yet more certain embodiments, about 35 nm.

In an embodiment according to any of the above methods, the ceramic powder comprises SiC having a specific surface area greater than 20 $m^2/g$.

In an embodiment according to any of the above methods, when mixing the fuel particles, ceramic powder, and rare earth oxide neutronic poisons, the ceramic powder may be in a variety of physical states (e.g., powder, liquid, slurry, etc.) depending on the mixing method used.

One nuclear fuel obtained from methods described above comprises: a fuel element comprising a plurality of fuel particles intermixed in a silicon carbide matrix, wherein the silicon carbide matrix separates at least one of the plurality of fuel particles embedded in the silicon carbide matrix from the other fuel particles embedded in the silicon carbide matrix, wherein the silicon carbide matrix is near-stoichiometic and has pockets of porosity of not more than 4%, and wherein the pockets include rare earth oxide neutronic poisons.

In an embodiment of the above fuel, the pockets include only rare earth oxide neutronic poisons and tramp elements. In another embodiment of the above fuel, the pockets include only rare earth oxide neutronic poisons, additional sintering additives, and tramp elements, wherein the additional sintering additives can include the same materials discussed above for additional sintering additives.

In an embodiment of any of the above described fuels, the rare-earth oxide neutronic poisons are selected from the group consisting of $Gd_2O_3$, $Er_2O_3$, $Dy_2O_3$, and $Eu_2O_3$, and combinations thereof.

In an embodiment of any of the above described fuels, the fuel particles are tristructural-isotropic fuel particles.

In an embodiment of any of the above described fuels, the silicon carbide matrix has pockets of porosity of not more than 3%, or, in certain embodiments, not more than 1%.

In an embodiment of any of the above described fuels, the silicon carbide matrix has low permeability to helium, for example less than $10^{-10}$ m$^2$/s or less than $10^{-11}$ m$^2$/s.

In an embodiment of any of the above described fuels, wherein the plurality of fuel particles comprise transuranic elements extracted from a spent fuel of a light water reactor.

In an embodiment of any of the above described fuels, wherein the plurality of fuel particles comprise transuranic elements extracted from a nuclear weapon.

BRIEF DESCRIPTION OF THE DRAWINGS

Embodiments of the invention will now be described by way of example with reference to the accompanying drawings, of which.

DETAILED DESCRIPTION OF PARTICULAR EMBODIMENTS

The following detailed description can be read in connection with the accompanying drawings in which like numerals designate like elements.

Figure 1:
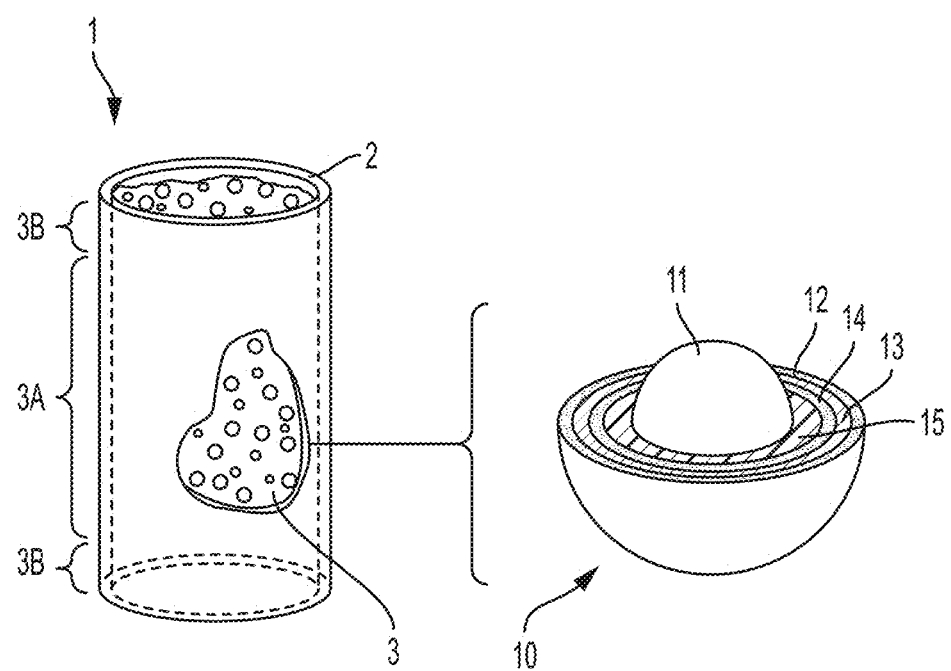
FIG. 1 is a schematic diagram illustrating a precursor mixture according to embodiments of the invention prior to sintering to Rum a fuel element.

FIG. 1 is a schematic diagram illustrating the formation and processing of nuclear fuel in accordance with the methods described above. In FIG. 1, an unprocessed fuel element 1 includes a plurality of micro-encapsulated fuel particles 10 mixed with a ceramic matrix 3 within a ceramic fuel sleeve 2. The plurality of micro-encapsulated fuel particles 10 may be tristructural-isotropic (TRISO) fuel particles. The term "TRISO fuel particle," as used herein, refers to any type of micro fuel particle comprising a fuel kernel and one or more layers of isotropic materials surrounding the fuel kernel. By way of example only, the fuel particle 10 may have a diameter of about 1 millimeter.

In the embodiment shown in FIG. 1, the fuel particle 10 includes a fuel kernel 11 at its center. The fuel kernel may comprise fissile and/or fertile materials (e.g., uranium, plutonium, thorium, etc.) in an oxide, carbide, or oxycarbide form. In a particular embodiment, the fuel kernel 11 includes low enriched uranium (LEU) of any suitable enrichment level.

When the fuel element is used for waste mitigation and/or disposal purposes, the fuel kernel 11 may alternatively or additionally include transuranics (TRU) and/or fission products extracted or otherwise reprocessed from spent fuels.

For example, the fuel element may be used for destruction of transuranic waste generated from, for example, light water reactors or decommissioned nuclear weapons. For that purpose, the fuel element may include fuel kernels 11 formed of transuranic elements extracted from a spent fuel of a light water reactor and/or a core of a nuclear weapon. According to a particular embodiment, a fuel element formed in accordance with the described methods may be used as fuel for a light water reactor to destroy the transuranic waste while, at the same time, generating power from it.

The fuel particle 10 illustrated in FIG. 1 also includes four distinct layers coated over the fuel kernel 11, namely (1) a porous carbon buffer layer 15; (2) an inner pyrolytic carbon (PyC) layer 14; (3) a ceramic layer 13; and (4) an outer PyC layer 12.

The porous carbon buffer layer 15 surrounds the fuel kernel 11 and serves as a reservoir for accommodating buildup of fission gases diffusing out of the fuel kernel 11 and any mechanical deformation that the fuel kernel 11 may undergo during the fuel cycle.

The inner PyC layer 14 may be formed of relatively dense PyC and seals the carbon buffer layer 15.

The ceramic layer 13 may be formed of a SiC material and serves as a primary fission product barrier and a pressure vessel for the fuel kernel 11, retaining gaseous and metallic fission products therein. The ceramic layer 13 also provides overall structural integrity of the fuel particle 10.

In some embodiments, the SiC in the ceramic layer 13 may be replaced or supplemented with zirconium carbide (ZrC) or any other suitable material having similar properties as those of SiC and/or ZrC.

The outer PyC layer 12 protects the ceramic layer 13 from chemical attack during operation and acts as an additional diffusion boundary to the fission products. The outer PyC layer 12 may also serve as a substrate for bonding to the surrounding ceramic matrix 3.

The configuration and/or composition of the fuel particle 10 are not limited to the embodiments described above. Instead, it should be understood that a fuel particle consistent with the present disclosure may include one or more additional layers, or omit one or more layers, depending on the desired properties of the fuel particle. For example, in certain embodiments, the fuel particle is overcoated with an additional ceramic layer (i.e., SiC layer) prior to being mixed with the ceramic matrix material.

In particular embodiments, the ceramic matrix 3 includes SiC powder mixed with rare earth oxide neutronic poisons alone or in combination with additional sintering additives and may be in a form of a powder-based slurry, a ceramic slurry for tape casting, or any other mixture type known in the art. Prior to the mixing, the fuel particles 10 may be coated with a suitable surface protection material. The SiC powder may have an average size of less than 1 μm and/or a specific surface area greater than 20 m$^2$/g. By way of example, the size of the SiC powder may range from about 15 nm to about 51 nm with the mean particle size being about 35 nm.

During or prior to mixing, rare earth oxide neutronic poisons are added, individually or in combination, to the SiC powder and/or coated onto the SiC powder surface. In certain embodiments, the amount of rare earth oxide neutronic poisons is up to 10 weight %, or, in more certain embodiments, from 1 to 10 weight %, or, in yet more certain embodiments, from 6 to 10 weight % based on the total weight of the precursor mixture.

Figure 2:
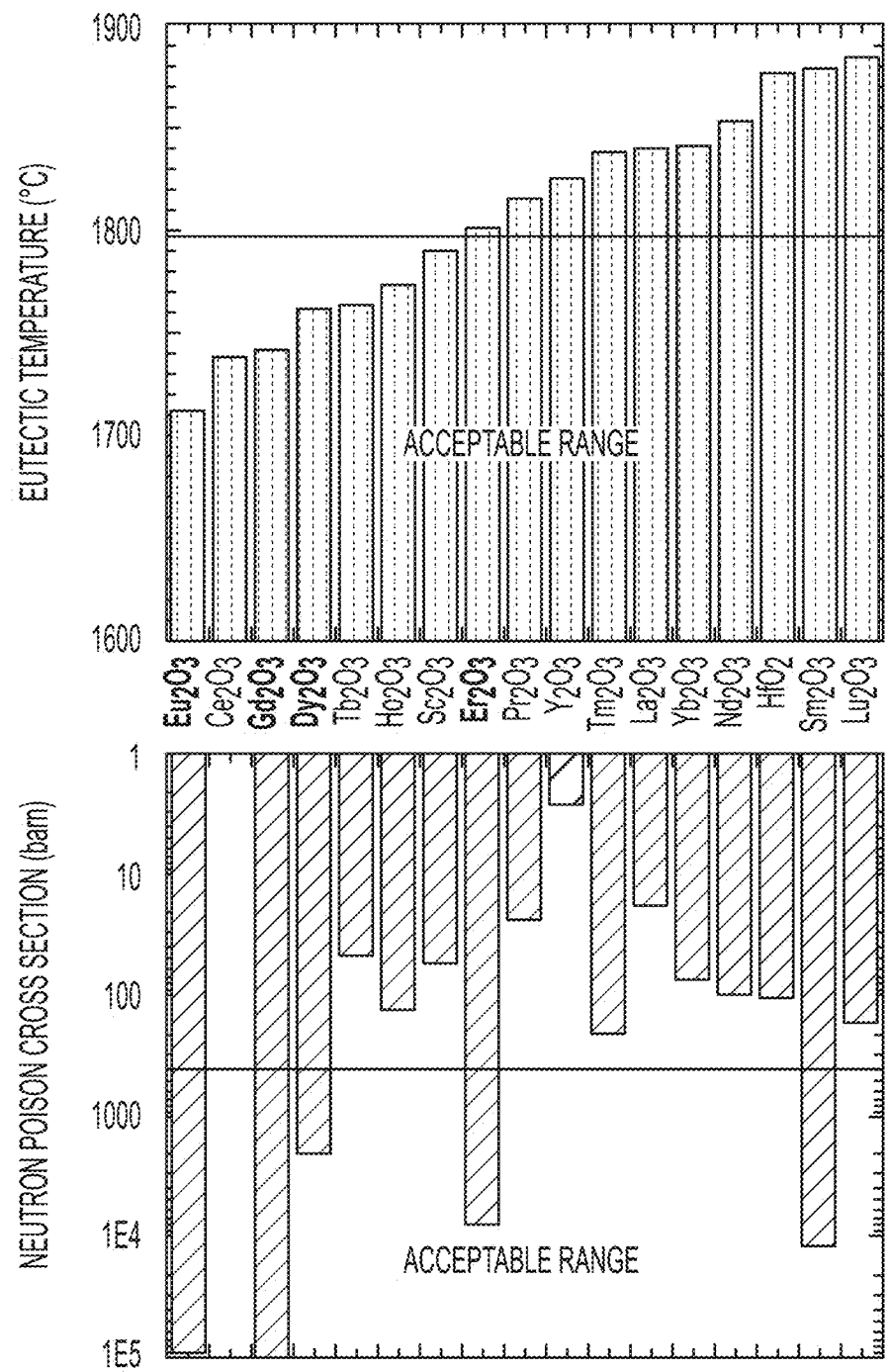
FIG. 2 is a pair of graphs illustrating the eutectic temperature and neutron poison cross section of certain rare earth oxides.

The rare earth oxide neutronic poisons are selected based on a combination of the effectiveness of the element in capturing thermal neutrons, as well as, its compatibility with, and ability to aid in, the fabrication process. FIG. 2 presents an array of potential rare-earth oxides along with the important parameters such as eutectic reaction temperature with alumina, and thermal neutron absorption cross section in barns. In the upper graph of FIG. 2, the shaded box represents an upper limit for the processing temperature as represented by the eutectic temperature with alumina. This upper limit is approximately 1800° C. Suppressing the processing temperature may also prove beneficial to processing of inert matrix fuels that include volatile species, thus potentially reducing species loss during processing. In the lower graph of FIG. 2, the shaded box represents a lower limit for the neutron poison cross section. This lower limit is approximately 500 barns. As seen by the compounds in bold in FIG. 2, suitable rare-earths include $Eu_2O_3$, $Gd_2O_3$, $Dy_2O_3$, and $Er_2O_3$.

Also during or prior to mixing, in addition to the rare earth oxide neutronic poisons, additional sintering additives may be added. Acceptable additional sintering additives include, for example, alumina and other rare earth oxides, such as $Y_2O_3$. The additional sintering additives may be added individually or in combination, to the SiC powder and/or coated onto the SiC powder surface. In certain embodiments, the total amount of rare earth oxide neutronic poisons and sintering additives is up to 10 weight %, or, in more certain embodiments, from 6 to 10 weight % of the total weight of the precursor mixture. In certain embodiments in which additional sintering additives are present, the rare earth oxide neutronic poisons are included in an amount of 0.5 to 6 weight percent, or, in more certain embodiments, 1 to 5 weight percent, or, in even more certain embodiments, 1 to 3 weight percent, or, in yet even more certain embodiments, 1 to 2 weight percent of the total weight of the precursor mixture.

The ceramic fuel sleeve 2 may be fabricated from, as example, SiC of similar pedigree to the ceramic matrix or from nuclear grade graphite. Alternatively, the ceramic fuel sleeve may include SiC fibers or intermediate density greenbodies of nano-powder SiC. Where the ceramic fuel sleeve is an intermediate density green-body of nano-powder SiC, the nano-powder constituents would contain similar amounts of rare earth oxide neutronic poisons and additional sintering elements as the ceramic matrix. In certain embodiments of the nano-powder SiC of the ceramic fuel sleeve, the SiC powder is somewhat larger than the SiC powder of the ceramic matrix to retard flow during sintering and thereby inhibiting movement of the TRISO through this outer wall.

The wall thickness of the ceramic fuel sleeve is determined from fuel structural and reactor neutronic considerations. In certain embodiments, the wall thickness is 0.5 mm or greater. Where more rigid structures are desired, the wall thickness may be increased up to as much as 2 mm. The use of the ceramic fuel sleeve helps eliminate the need for final machining.

In an alternative process, the mixture of fuel particles 10 and ceramic matrix 3 with or without the ceramic fuel sleeve may be placed within a die 4 and then a current can be applied to the die so as to sinter the mixture by direct current sintering into a fuel element. The die can include more than one parallel opening and the method can include placing a mixture of fuel particles 10 and ceramic matrix 3 in each of the openings. The die can comprise graphite.

The mixture of fuel particles 10 and ceramic matrix 3 may be uniform throughout or as a layered structure where the top and bottom layers of the mixture are free of fuel particles. An example of this layered structure is illustrated in FIG. 1 by reference number 3A referring to the central region of the green body or unprocessed fuel element 1 that contains fuel particles along with the ceramic matrix powder constituents and reference number 3B referring to top and bottom areas, which do not contain fuel particles. In certain embodiments, the nominal final thickness of the 3B layers is equal to or similar to the thickness of the wall thickness of the ceramic fuel sleeve. For example, the nominal thickness of the 3B layers is from 0.5 to 2 mm.

In certain embodiments, the 3B layers, if present, would function to be a layer having variable and likely reduced levels of poison and non-poison sintering aid oxide additives for reactor coolant compatibility issues. The level of sintering aid in this layer may be as low as zero. In certain embodiments, the 3B layers, if present, function to provide added safety to the fuel by increasing the path length for migrating fission products to reach the free surface of the fuel.

Figure 3:
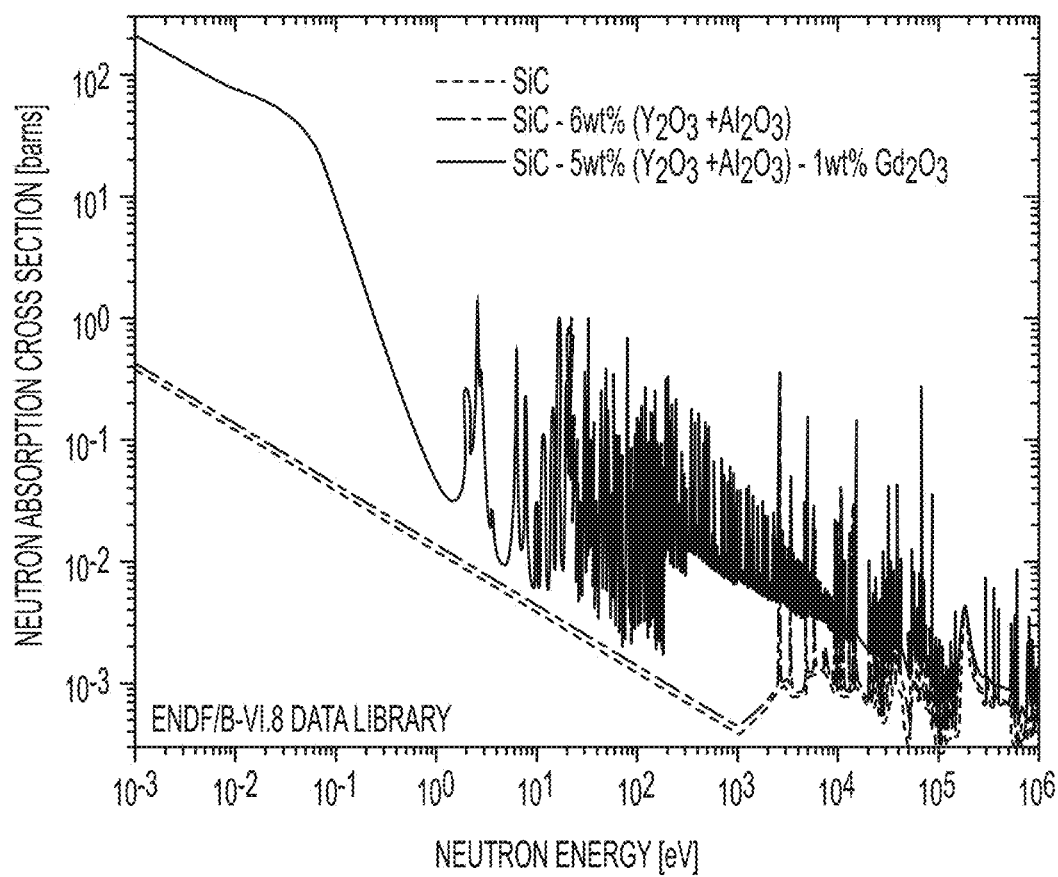
FIG. 3 is a graph illustrating the neutron absorption cross section for matrices for exemplary fuel elements with and without presence of a rare earth oxide neutron poison.

FIG. 3 is an example of the neutron absorption cross section or neutron poison cross section for the ceramic matrix with and without presence of $Gd_2O_3$, which is an example of a rare earth oxide neutronic poison identified above. It is shown that upon addition of 1 weight percent gadolinia to the ceramic matrix, the neutron absorption probability of this medium increases by more than 100-fold in the thermal region of the spectrum (neutron energy ~0.025 ev).

Figure 4:
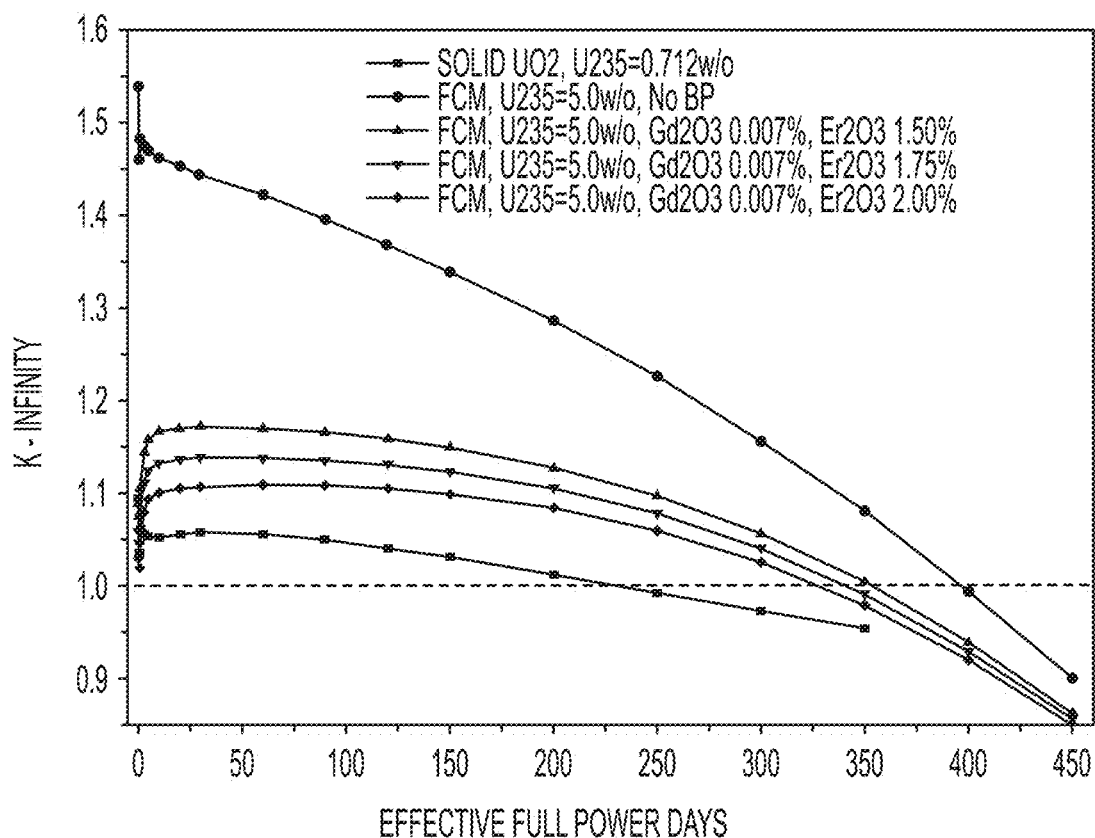
FIG. 4 is a graph illustrating the neutronic impact of including percent-level neutron poisons on core reactivity.

FIG. 4 presents the impact of incorporating rare earth oxide neutronic poisons within the ceramic fuel on neutronic performance of a representative reactor core. In these examples, a high-temperature-gas-cooled reactor (HTGR) core is presented. Similar performance occurs in other FCM-fueled platforms such as light and heavy water cooled reactors. A comparison of the large initial reactivity (upper curve of FIG. 4: legend; FCM, U235=5.0w/0, No BP) with that of a standard $UO_2$-fueled HTGR core (curve just above the unity line of FIG. 1: legend; Solid $UO_2$, U235=0.712w/o) is clearly seen. Through inclusion of varying amounts of burnable poison, chosen in this example as combinations of $Gd_2O_3$ and $Er_2O_3$ in the range of 1.57 to 2.07 total weight percent, the reactivity curves are clearly flattened, approaching the neutronic behavior of the non-poisoned $UO_2$.

Figure 5:
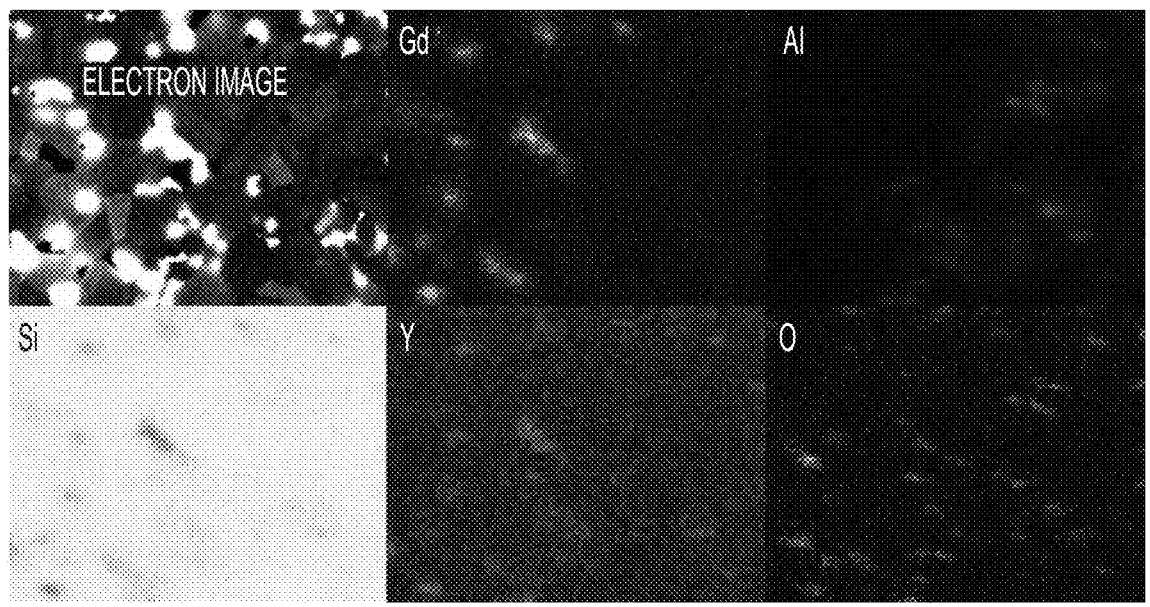
FIG. 5 is a series of SEM images with the top left being a polished cross section of a ceramic matrix processed with a rare-earth oxide poison ($Gd_2O_3$). The top center being the characteristic x-ray map for Gd; the top right being the characteristic x-ray map for Al; the bottom left being the characteristic x-ray map for Si; the bottom center being the characteristic x-ray map for Y; and the bottom right being the characteristic x-ray map for O.
Figure 6:
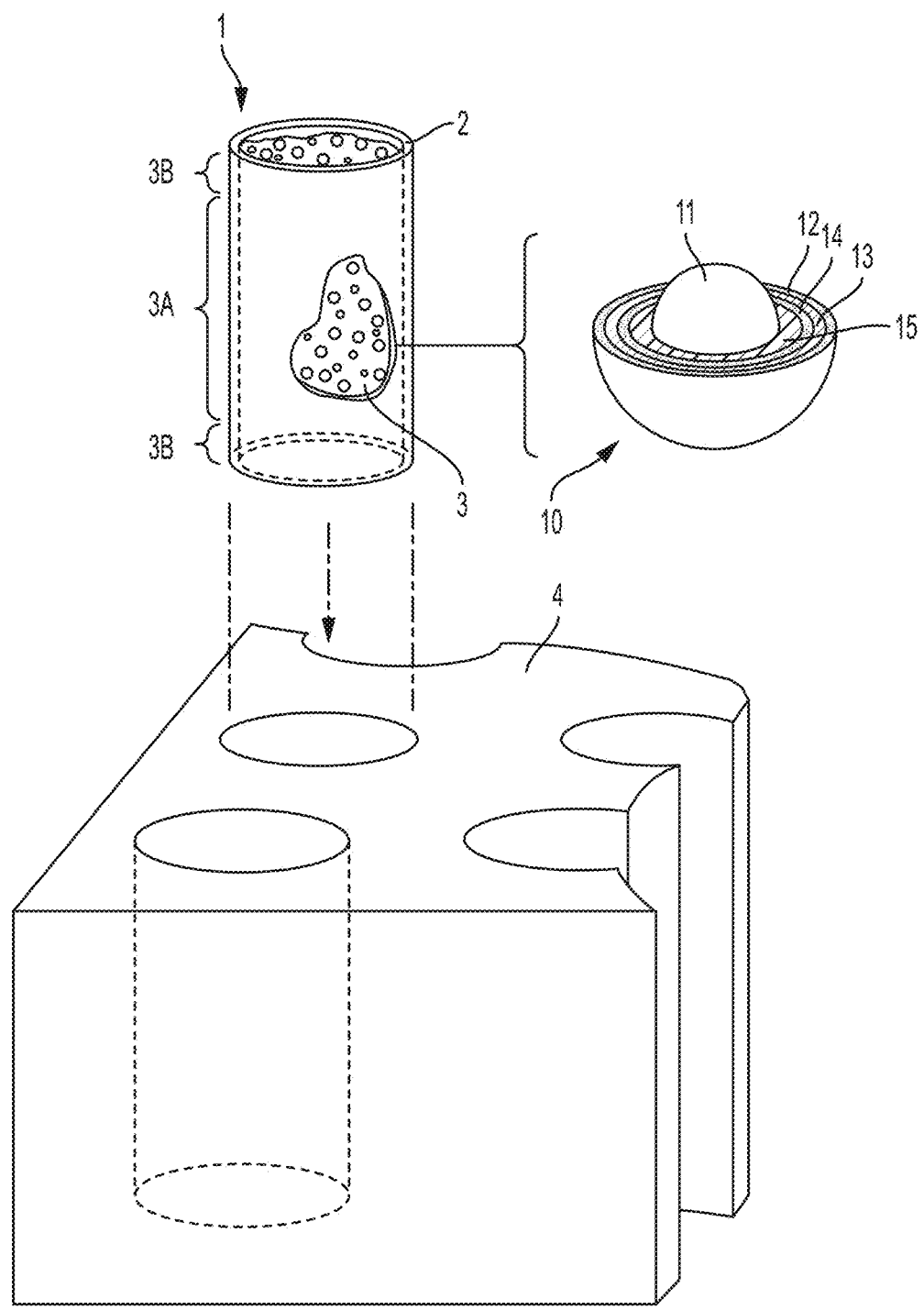
FIG. 6 is a schematic diagram illustrating precursor mixture according to embodiments of the invention to be processed within a multi-fuel die.

FIG. 5 shows a backscattered electron microscopy image of a polished section of ceramic matrix fabricated with $Gd_2O_3$. In this example, 1 wt % of this poison replaces $Al_2O_3$ and $Y_2O_3$ in the SiC powder for a total oxide addition of 6 percent. As seen from FIG. 5, the matrix is comprised of large crystallites with low porosity typical of the FCM consolidation process. The image of the figure is qualitatively indistinguishable from an image of an FCM fuel processed with $Al_2O_3$ and $Y_2O_3$. As with the typical FCM matrix formed with $Al_2O_3$ and $Y_2O_3$, the $Gd_2O_3$ resides at the triple junctions (bright pockets in micrographs) rather than as a continuous layer along the SiC grain boundaries, assuring irradiation stability. This is also shown by mapping the characteristic x-ray signal associated with Gd and other constituents of the FCM matrix in the same figure.

Although illustrated in separate figures, any features illustrated and described within one figure or embodiment could be substituted or added to any of the other embodiments described above.

Although described in connection with preferred embodiments thereof, it will be appreciated by those skilled in the art that additions, deletions, modifications, and substitutions not specifically described may be made without departure from the scope of the invention as defined in the appended claims.

What is claimed is:

1. A method comprising:
providing a plurality of tristructural-isotropic fuel particles;
mixing the plurality of tristructural-isotropic fuel particles with silicon carbide powder and at least two different rare earth oxide neutronic poisons to form a precursor mixture in which the silicon carbide powder separates at least one of the plurality of tristructural-isotropic fuel particles embedded in the silicon carbide powder from the other tristructural-isotropic fuel particles embedded in the silicon carbide powder; and
compacting the precursor mixture at a predetermined pressure and temperature to form a fuel element in which the silicon carbide powder becomes a silicon carbide matrix having a density substantially equal to the theoretical density of stoichiometric silicon carbide and having pockets of porosity of not more than 4%,
wherein the pockets include the rare earth oxide neutronic poisons,
wherein one of the rare earth oxide neutronic poisons is $Eu_2O_3$, and
wherein the rare earth neutronic poisons are in an amount of up to 6 weight percent.

2. The method according to claim 1, wherein the rare earth oxide neutronic poisons include rare earth oxides having a large neutron capture cross-section and ability to suppress a sintering temperature of the silicon carbide powder below a critical damage temperature of the tristructural-isotropic fuel particles.

3. The method according to claim 1, wherein additional rare earth oxide neutronic poisons are selected from the group consisting of $Gd_2O_3$, $Er_2O_3$, and $Dy_2O_3$.

4. The method according to claim 1, further comprising: mixing additional sintering additives to the precursor mixture of the silicon carbide powder and the rare earth oxide neutronic poisons.

5. The method according to claim 4, wherein the additional sintering additives include alumina, yttria, or other rare earth oxides, or combinations thereof.

6. The method according to claim 1, wherein one or more of the rare earth oxide neutronic poisons are oxide sintering additives in the precursor mixture.

7. The method according to claim 1, wherein the precursor mixture consists essentially of the silicon carbide powder and the rare earth oxide neutronic poisons.

8. The method according to claim 1, wherein the precursor mixture includes the rare earth oxide neutronic poisons in an amount up to 10 weight percent of a total weight of the precursor mixture.

9. The method according to claim 1, wherein a combination of the rare earth oxide neutronic poisons and any additional sintering additives is in an amount up to 10 weight percent of a total weight of the precursor mixture.

10. The method according to claim 1, wherein the predetermined temperature is less than 1900° C.

11. A nuclear fuel comprising:
a fuel element comprising a plurality of tristructural-isotropic fuel particles intermixed in a silicon carbide matrix,
wherein the silicon carbide matrix separates a least one of the plurality of tristructural-isotropic fuel particles embedded in the silicon carbide matrix from the other tristructural-isotropic fuel particles embedded in the silicon carbide matrix,
wherein the silicon carbide matrix has a density substantially equal to the theoretical density of stoichiometric silicon carbide and has pockets of porosity of not more than 4%,
wherein the pockets include at least two different rare earth oxide neutronic poisons,
wherein one of the rare earth rare earth oxide neutronic poisons is $Eu_2O_3$, and
wherein the rare earth neutronic poisons are in an amount of up to 6 weight percent.

12. The nuclear fuel according to claim 11, wherein the pockets consist essentially of the rare earth oxide neutronic poisons.

13. The nuclear fuel according to claim 11, wherein the pockets consist essentially of the rare earth oxide neutronic poisons and sintering additives.

14. The nuclear fuel according to claim 11, wherein additional rare earth oxide neutronic poisons are selected from the group consisting of $Gd_2O_3$, $Er_2O_3$, and $Dy_2O_3$.

15. A nuclear fuel comprising:
a fuel element comprising a plurality of tristructural-isotropic fuel particles intermixed in a silicon carbide matrix,
wherein the silicon carbide matrix separates a least one of the plurality of tristructural-isotropic fuel particles embedded in the silicon carbide matrix from the other tristructural-isotropic fuel particles embedded in the silicon carbide matrix,
wherein the silicon carbide matrix has a density substantially equal to the theoretical density of stoichiometric silicon carbide and has pockets of porosity of not more than 4%,
wherein the pockets include rare earth oxide neutronic poisons, and
wherein the rare earth oxide neutronic poisons include combinations of $Gd_2O_3$ and $Er_2O_3$ in a range of 1.57 to 2.07 total weight percent.

16. The nuclear fuel according to claim 15, wherein the pockets consist essentially of the rare earth oxide neutronic poisons.

17. The nuclear fuel according to claim 15, wherein the pockets consist essentially of the rare earth oxide neutronic poisons and sintering additives.

18. The nuclear fuel according to claim 15, wherein additional rare earth oxide neutronic poisons further include $Dy_2O_3$.

* * * * *

UNITED STATES PATENT AND TRADEMARK OFFICE
CERTIFICATE OF CORRECTION

| | | |
|---|---|---|
| PATENT NO. | : 11,101,048 B2 | Page 1 of 1 |
| APPLICATION NO. | : 15/363060 | |
| DATED | : August 24, 2021 | |
| INVENTOR(S) | : Francesco Venneri | |

It is certified that error appears in the above-identified patent and that said Letters Patent is hereby corrected as shown below:

In the Claims

In Claim 15 at Column 10, Line 37, the text "wherein the silicon carbide matrix separates a least one of" should read as follows: -wherein the silicon carbide matrix separates at least one of- Signed and Sealed this
Ninth Day of May, 2023

Katherine Kelly Vidal
*Director of the United States Patent and Trademark Office*